(12) United States Patent
Komatsu

(10) Patent No.: US 8,289,615 B2
(45) Date of Patent: Oct. 16, 2012

(54) METHOD FOR ENCLOSING DISPERSION LIQUID CONTAINING ELECTROPHORETIC PARTICLES AND ELECTROPHORETIC DISPLAY UNIT

(75) Inventor: Harunobu Komatsu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 111 days.

(21) Appl. No.: 13/037,666

(22) Filed: Mar. 1, 2011

(65) Prior Publication Data

US 2011/0222141 A1    Sep. 15, 2011

(30) Foreign Application Priority Data

Mar. 10, 2010 (JP) ................................. 2010-053293
Jul. 15, 2010 (JP) ................................. 2010-160758

(51) Int. Cl.
*G02B 26/00*    (2006.01)
*G09G 3/34*    (2006.01)

(52) U.S. Cl. ........................................ 359/296; 345/107
(58) Field of Classification Search .................. 359/296; 345/107; 430/32; 204/600
See application file for complete search history.

(56) References Cited

U.S. PATENT DOCUMENTS

2002/0188053 A1    12/2002    Zang et al.
2011/0120871 A1*    5/2011    Reid et al. ..................... 204/540

FOREIGN PATENT DOCUMENTS

| JP | 5-165064 A | 6/1993 |
| JP | 2005-509690 A | 4/2005 |
| WO | WO-02-98977 A | 12/2002 |

* cited by examiner

*Primary Examiner* — William Choi
(74) *Attorney, Agent, or Firm* — AdvantEdge Law Group, LLC

(57) ABSTRACT

To prevent the incorporation of gas, such as air (bubbles), into cells during the enclosure of a dispersion liquid containing electrophoretic particles in the cells. In the enclosure of a dispersion liquid, which contains electrophoretic particles dispersed in a hydrophobic dispersion medium, in a matrix of cells defined by a plurality of partitions, the dispersion liquid is supplied to the cells, an LB film of amphiphilic molecules each having both a hydrophilic group and a hydrophobic group is formed over at least exposed portions of the dispersion liquid in the openings of the cells, and the openings of the cells are hermetically sealed with a substrate with the LB film interposed therebetween.

8 Claims, 9 Drawing Sheets

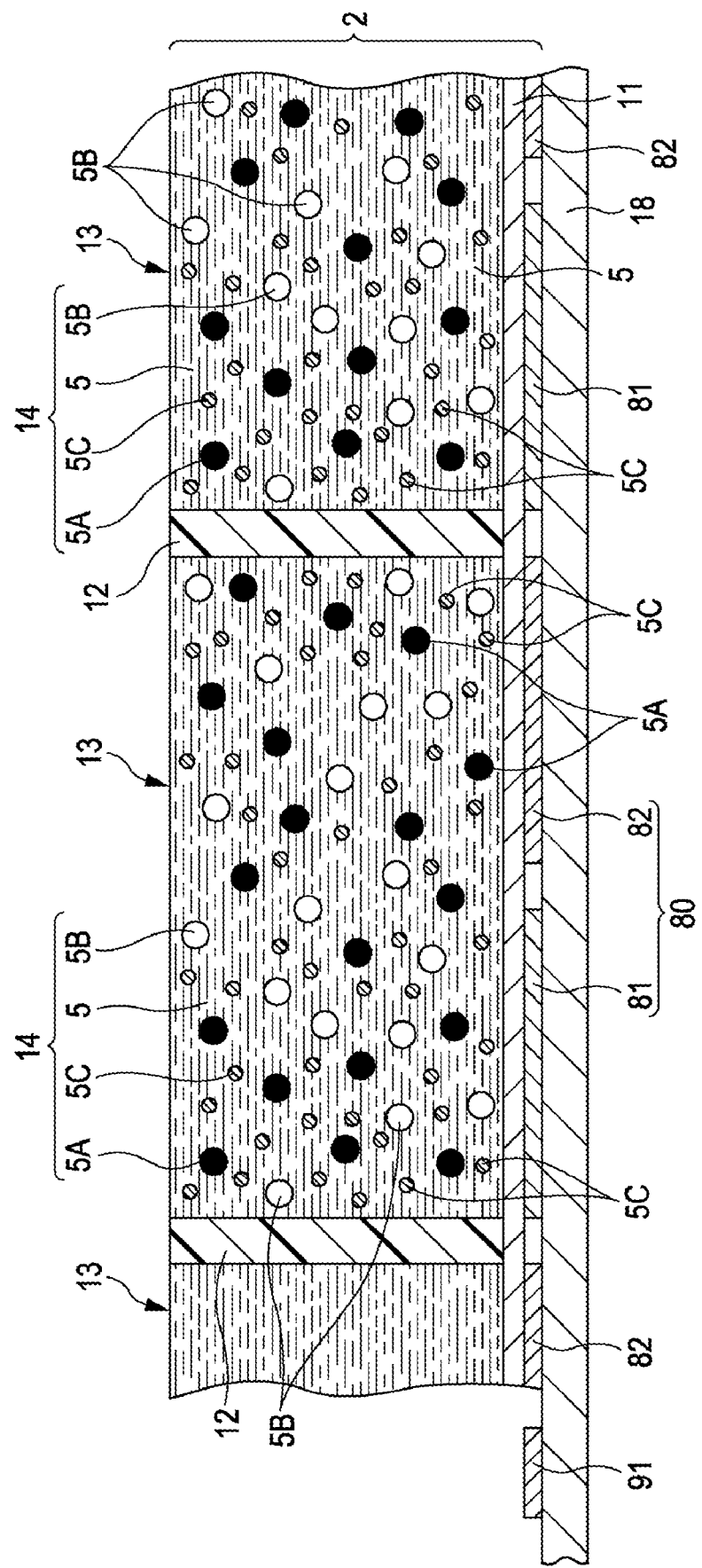

METHOD FOR ENCLOSING DISPERSION LIQUID CONTAINING ELECTROPHORETIC PARTICLES AND ELECTROPHORETIC DISPLAY UNIT

CROSS-REFERENCE TO RELATED APPLICATION

This application is based on and claims priority from Japanese Patent Application No. 2010-053293, filed on Mar. 10, 2010, and Japanese Patent Application No. 2010-160758, filed on Jul. 15, 2010, the contents of which are incorporated herein by reference.

BACKGROUND

1. Technical Field

The present invention relates to an electrophoretic display technique.

2. Related Art

Upon the application of an electric field to a dispersion liquid (also referred to as a "disperse system") containing electrically-charged particles dispersed in a solvent (a dispersion medium), the particles move (are electrophoresed) in the dispersion medium by the action of the Coulomb force. This phenomenon is called electrophoresis. Electrophoretic displays (EPDs) utilize electrophoresis to display desired information, such as images.

Known EPDs include a plurality of spaces (cells) separated by partitions between a pair of substrates. Each of the cells includes a disperse system containing electrically-charged particles (electrophoretic particles) in a dispersion medium. Such EPDs can be manufactured by filling each of the cells with the disperse system and sealing the opening of each of the cells. The sealing may be performed by a method described in JP-A-5-165064 or JP-T-2005-509690.

In accordance with JP-A-5-165064, the opening of each of the cells is covered with a flexible electrode, and the cells are then sealed while excess dispersion liquid is forced out by applying pressing force to the flexible electrodes.

In accordance with JP-T-2005-509690, the cells are sealed with a sealing composition. The sealing composition contains a thermoplastic elastomer and a solvent or a solvent mixture immiscible with the dispersion liquid and having a lower specific gravity than the dispersion liquid. The sealing composition having a lower specific gravity than the dispersion liquid is separated upward from the dispersion liquid. Hardening of the thermoplastic elastomer in such a state allows the sealing of the cells.

It is important to prevent the incorporation of air (bubbles) into the cells during the enclosure of the dispersion liquid in the cells. In the sealing under mechanically pressing force according to JP-A-5-165064, depending on the amount of dispersion liquid enclosed in the cells, bubbles may be incorporated into the cells.

In accordance with the technique disclosed in JP-T-2005-509690, an insufficient difference in specific gravity between the dispersion liquid and the sealing composition may result in insufficient separation of the sealing composition from the dispersion liquid. This makes the control of the amount of dispersion liquid enclosed in the cells difficult, possibly causing variations in the amount of dispersion liquid.

SUMMARY

An advantage of some aspects of the invention is that it provides a simple method by which the incorporation of gas, such as air (bubbles), into cells can be reliably prevented during the enclosure of a dispersion liquid containing electrophoretic particles in the cells.

Another advantage of some aspects of the invention is that it provides an operational advantage that is brought by the constitution according to the embodiments described below and that cannot be achieved by existing techniques.

First Aspect

A method for enclosing a dispersion liquid in a plurality of cells on one surface of a first substrate, the dispersion liquid containing electrophoretic particles dispersed in a hydrophobic dispersion medium, the plurality of cells being defined by a plurality of partitions. The method includes:

supplying the dispersion liquid to the plurality of cells through openings defined by the partitions, forming a sealing film containing amphiphilic molecules over at least exposed portions of the dispersion liquid in the plurality of cells, and covering the sealing film on the openings with a second substrate to hermetically seal the openings with the sealing film interposed therebetween.

The sealing film containing amphiphilic molecules disposed between the second substrate and the exposed portions of the dispersion liquid supplied to the plurality of cells can alter the surface state of the dispersion liquid. More specifically, the sealing film can reduce an affinity between the dispersion liquid and the second substrate.

Thus, when the second substrate covers the openings, the sealing film can prevent the dispersion liquid from being drawn by the substrate and overflowing, thereby preventing the incorporation of air (bubbles) into the dispersion liquid in the cells during the enclosure of the dispersion liquid in the cells. Consequently, a desired electric field can be appropriately applied to the electrophoretic particles in the cells.

The term "amphiphilic molecule", as used herein, refers to a molecule having both a hydrophilic group and a hydrophobic group. This also applies to the description of an electrophoretic display unit described below.

Second Aspect

In the method according to the first aspect, a molecular film of amphiphilic molecules is formed on the surface of water in a container, the plurality of cells are supplied with the dispersion liquid, and then the first substrate is dipped into and raised out of the water at a predetermined angle with respect to the surface of the water to form the sealing film over at least exposed portions of the dispersion liquid in the plurality of cells.

This facilitates the formation of a monomolecular film on the surface of water in the container. The monomolecular film is composed of amphiphilic molecules each having a hydrophilic group facing water and a hydrophobic group facing the air.

The molecular film formed on the surface of the water can be transferred to the first substrate by the simple reciprocating movement of the first substrate. Thus, the sealing film of amphiphilic molecules can be formed in a region including the exposed portions of the dispersion liquid in the plurality of cells formed on the first substrate. Furthermore, the thickness of the sealing film can be controlled by more than one reciprocating movements of the first substrate.

The sealing film can have a thickness as small as the thickness of the monomolecular film.

In an electrophoretic display manufactured by this method, a dielectric layer between an electrode on the upper side (on top of the partitions) and an electrode on the bottom side (the first substrate side (the bottom side of the cells)) can have a small thickness. This can reduce the thickness of a layer shielding an electric field, thereby increasing (strengthening) the effective electric field applied to the electrophoretic particles in the cells and correspondingly reducing the driving voltage.

The molecular film of amphiphilic molecules formed of a monomolecular film is referred to as a monomolecular built-up film or a Langmuir-Blodgett (LB) film.

The predetermined angle may be any angle at which the molecular film of amphiphilic molecules can be appropriately transferred to the surface of the first substrate on which the plurality of cells are formed. For example, the surface of the first substrate may be perpendicular to the surface of water. Such a method for forming a film by the reciprocating movement of the first substrate in the direction perpendicular to the surface of water is referred to as a vertical dipping method.

Third Aspect

In the method according to the first or second aspect, a UV-curable adhesive layer is formed on a surface of the second substrate to be in contact with the sealing film, the openings are covered with the second substrate, and the second substrate is then irradiated with ultraviolet rays to fix the second substrate to the partitions and hermetically seal the openings.

The film of amphiphilic molecules can reduce an affinity between the adhesive layer on the second substrate and the exposed portions (principally the surface of the liquid) of the dispersion liquid. This can prevent the dispersion liquid from being drawn by the second substrate and overflowing when the second substrate covers the openings.

Even in the case that the sealing film is formed on the partitions defining the plurality of cells, the adhesive can be cured while the sealing film is moderately infiltrated with the adhesive. The second substrate can therefore be strongly bonded to the partitions.

This allows the dispersion liquid to be hermetically enclosed and can prevent a misalignment between the first substrate and the second substrate.

Furthermore, the sealing film can prevent the adhesive from reaching the dispersion liquid, thereby preventing the adhesive from being mixed with the dispersion liquid and adversely affecting display characteristics.

Fourth Aspect

In the method according to any one of the first to third aspects, an amphiphilic substance selected from the group consisting of lauric acid, myristic acid, pentadecylic acid, palmitic acid, margaric acid, stearic acid, arachidic acid, elaidic acid, and monounsaturated fatty acids is used in the formation of the sealing film containing amphiphilic molecules.

Owing to the characteristics of the hydrophobic groups of amphiphilic molecules of the amphiphilic substance and the hydrophobic dispersion medium, a film of the amphiphilic molecules is formed between the second substrate and the exposed portions of the dispersion liquid supplied to the plurality of cells. The film of the amphiphilic molecules can alter the surface state of the dispersion liquid.

Fifth Aspect

In the method according to any one of the first to fourth aspects, the dispersion medium is selected from the group consisting of alcohol solvents, esters, terpenes, aliphatic hydrocarbons, aromatic hydrocarbons, hydrophobic organic solvents, and mixtures thereof.

Owing to the characteristics of the hydrophobic groups of amphiphilic molecules and the hydrophobic dispersion medium, the hydrophobic groups of amphiphilic molecules are adsorbed on the exposed portions of the dispersion liquid supplied to the plurality of cells, thereby forming a film of amphiphilic molecules. The film of amphiphilic molecules can alter the surface state of the dispersion liquid.

Sixth Aspect

An electrophoretic display unit includes:

a first substrate, a plurality of cells defined by a plurality of partitions on one surface of the first substrate, a dispersion liquid supplied to the plurality of cells, the dispersion liquid containing electrophoretic particles dispersed in a hydrophobic dispersion medium, a sealing film containing amphiphilic molecules formed over at least exposed portions of the dispersion liquid in the plurality of cells, and a second substrate, wherein the second substrate covers the sealing film on openings defined by the partitions to hermetically seal the openings with the sealing film interposed therebetween.

In the film of amphiphilic molecules, the hydrophobic groups are adsorbed on the dispersion liquid. Thus, an interaction between the hydrophobic groups of the sealing film and hydrophobic groups of the electrophoretic particles can improve the retentivity of the electrophoretic particles drawn by the second substrate.

Seventh Aspect

In the electrophoretic display unit according to the sixth aspect, the sealing film containing amphiphilic molecules is formed of molecules of one acid selected from the group consisting of lauric acid, myristic acid, pentadecylic acid, palmitic acid, margaric acid, stearic acid, arachidic acid, elaidic acid, and monounsaturated fatty acids.

Owing to the characteristics of the amphiphilic substance and the hydrophobic dispersion medium, in the film of amphiphilic molecules, the hydrophobic groups of the amphiphilic molecules are adsorbed on the hydrophobic dispersion liquid.

This can achieve the same operation and effect as the sixth aspect.

Eighth Aspect

In the electrophoretic display unit according to the sixth or seventh aspect, the dispersion medium contains any one selected from the group consisting of alcohol solvents, esters, terpenes, aliphatic hydrocarbons, aromatic hydrocarbons, hydrophobic organic solvents, and mixtures thereof.

Owing to the characteristics of the amphiphilic substance and the hydrophobic dispersion medium, in the film of amphiphilic molecules, the hydrophobic groups of the amphiphilic molecules are adsorbed on the hydrophobic dispersion liquid.

This can achieve the same operation and effect as the seventh aspect.

BRIEF DESCRIPTION OF THE DRAWINGS

The invention will be described with reference to the accompanying drawings, wherein like numbers reference like elements.

FIG. 3 is a fragmentary cross-sectional view taken along the line III-III of FIG. 2.

DESCRIPTION OF EXEMPLARY EMBODIMENTS

Figure 1:
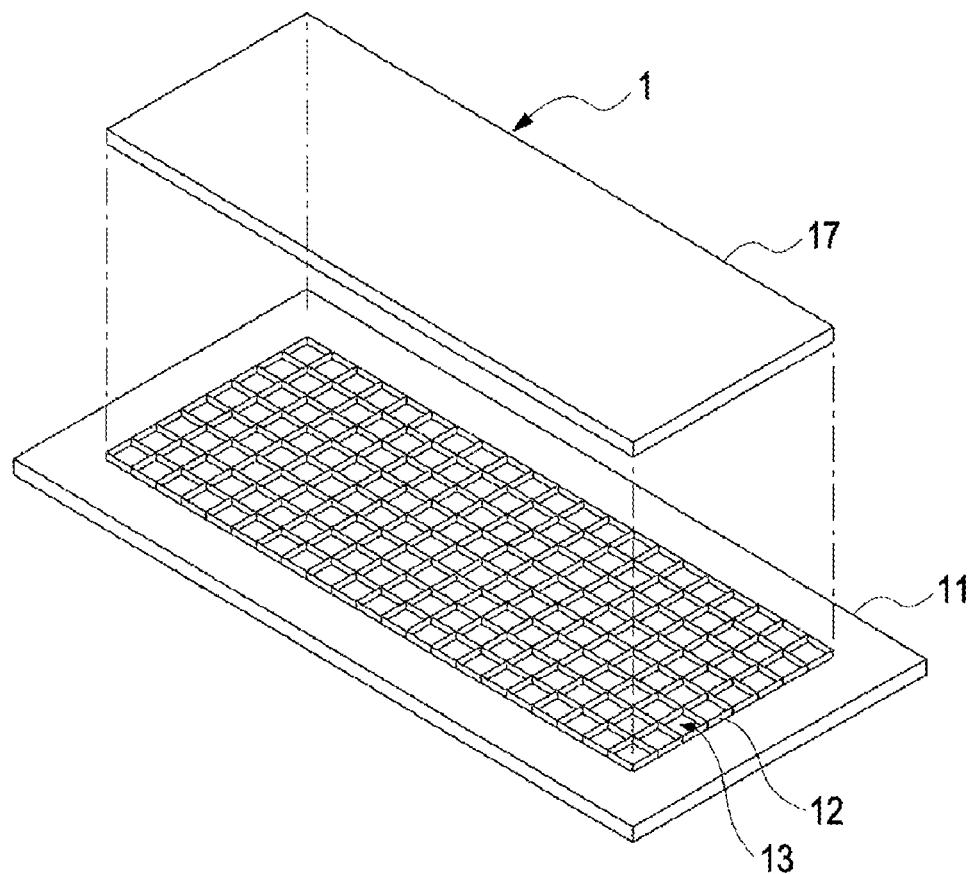
FIG. 1 is a schematic exploded perspective view of an electrophoretic display.

Embodiments of the invention will be described below with reference to the accompanying drawings. FIGS. 1 to 10 illustrate embodiments of a method for enclosing a dispersion liquid containing electrophoretic particles and an electrophoretic display unit according to the invention.

However, the following embodiments are shown for illustrative purposes only and are not intended to exclude various modifications and technical applications not explicitly described in the embodiments. In other words, various modifications can be made in the invention without departing from the gist of the invention. Like reference numerals designate like parts throughout these drawings. The drawings are schematic views and not necessarily have the actual sizes or proportions. The relationship of the sizes or proportions between the drawings may be different.

Figure 2:
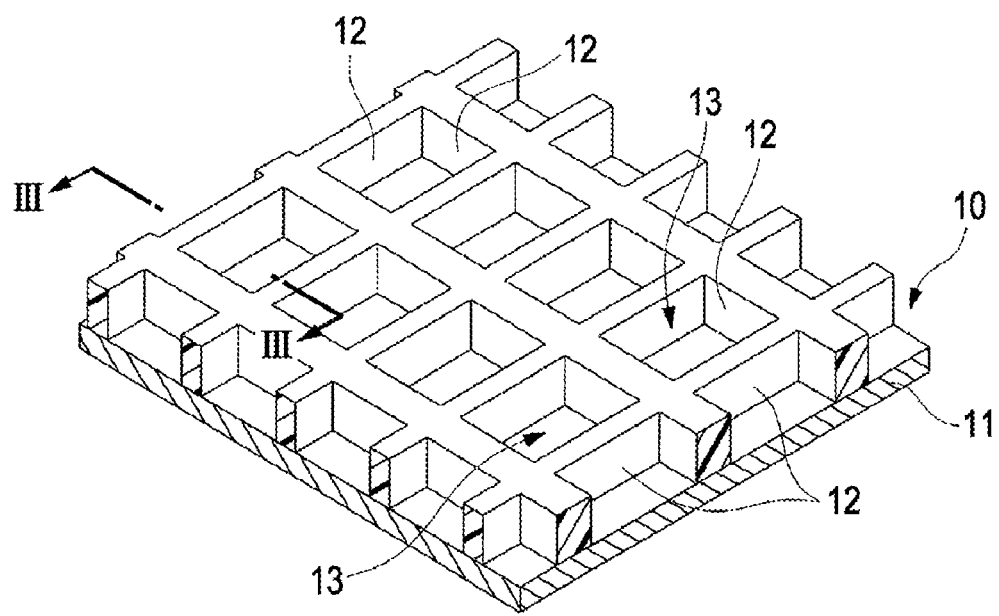
FIG. 2 is a schematic fragmentary perspective view of a cell matrix of an electrophoretic display illustrated in FIG. 1.

FIG. 1 is a schematic exploded perspective view of an electrophoretic display. FIG. 2 is a schematic fragmentary perspective view of a cell matrix 10 of an electrophoretic display 1 illustrated in FIG. 1. FIG. 3 is a fragmentary cross-sectional view taken along the line III-III of FIG. 2.

As illustrated in FIGS. 1 and 2, an electrophoretic display (EPD) 1 according to the present embodiment includes a substrate 11, a plurality of cells (depressed portions) 13 defined by a plurality of partitions 12 on one surface of the substrate 11, and a substrate 17 to be bonded to the partitions 12 to cover the openings of the cells 13. The plurality of cells 13 are regularly arranged on one surface of the substrate 11 and constitute the cell matrix 10.

The substrate 11 may be a glass substrate or a flexible sheet-like member. For example, the substrate 11 of a flexible sheet-like member can provide a deformable display area, such as electronic paper. Examples of the material of the flexible sheet-like member include polyolefins, liquid crystal polymers, and thermoplastic elastomers, and copolymers, blends, and polymer alloys of these. These materials may be used alone or in combination. The thickness of the sheet-like member can be appropriately determined while keeping the balance between the flexibility and the strength of the EPD 1 and, as a non-limiting example, ranges from approximately 20 to 500 μm.

The partitions 12 can be constructed by forming walls (raised portions) in a predetermined pattern on one surface of the substrate 11. The raised portions may be formed by a printing method, such as an ink jet method (a droplet ejection method) or a screen printing method, or photolithography. Alternatively, the partitions 12 may be formed by the formation of a layer of the material of the raised portions on the substrate 11 and subsequent mechanical, physical, or chemical etching, machining, such as laser machining or embossing, or abrasive blasting in a predetermined pattern.

Examples of the material of the partitions 12 include various resin materials, such as epoxy resins, acrylic resins, urethane resins, melamine resins, and phenolic resins, and various ceramic materials, such as silica, alumina, and titania. These materials may be used alone or in combination. The distance between the substrate 11 and the substrate 17 (the average height of the partitions 12) may range from approximately 10 to 500 μm.

Each of the cells 13 defined by the partitions 12 may correspond to a pixel, which is the unit of display of images and the like. The openings of the cells 13 may have any shape, such as triangular, tetragonal, hexagonal, circular, or elliptical. For example, a honeycomb of the cells 13 each having a hexagonal opening can improve the mechanical strength of the display area of the EPD 1.

As illustrated in FIG. 3, each of the cells 13 is supplied with a solution (a disperse system) 14, for example, containing three types of electrophoretic particles 5A to 5C dispersed (suspended) in a certain solvent (a dispersion medium) 5. The disperse system 14 may be supplied to the cells 13 by a method of dipping the cell matrix 10 into the disperse system 14, a drop method using a dispenser, or a coating method, such as an ink jet method (a droplet ejection method), a spin coating method, a dip coating method, or a spray coating method. The disperse system 14 can be selectively supplied to target cells among the cells 13 by the drop method or the ink jet method. Thus, the disperse system 14 can be reliably supplied to the cells 13 with a minimum of waste. The disperse system 14 may be supplied to the cells 13 not only vertically downward but also vertically upward, laterally, or obliquely.

Examples of the dispersion medium 5 include various liquids, such as solvents for use in electrodeposition coating and solvents for use in liquid developers for electrostatic imaging. Examples of the dispersion medium 5 include alcohol solvents, such as ethanol, esters, such as amyl acetate, terpenes, such as turpentine, aliphatic hydrocarbons, such as petroleum, aromatic hydrocarbons, such as toluene and benzene, and various oils (hydrophobic organic solvents). These may be combined or colored. Various dyes, such as anthraquinone dyes, azo dyes, indigoid dyes, and triphenylmethane dyes may be used in coloring.

The electrophoretic particles 5A to 5C dispersed in the dispersion medium 5 are charged particles (carrying electric charges) and are electrophoresed in the dispersion liquid by the application of an electric field from the outside (an electrode not illustrated). The electrophoretic particles may be at least one of pigment particles, resin particles, and composite particles of these.

Examples of the pigment constituting the pigment particles include black pigments, such as aniline black and carbon black, white pigments, such as titanium oxide and antimony oxide, azo pigments, such as monoazo, disazo, and polyazo, yellow pigments, such as isoindolinone, chrome yellow, and yellow iron oxide, red pigments, such as quinacridone red and chrome vermilion, blue pigments, such as phthalocyanine blue and indanthrene blue, and green pigments, such as phthalocyanine green. These pigments may be used alone or in combination.

Examples of the resin material constituting the resin particles include acrylic resins, urethane resins, urea resins, epoxy resins, polystyrene, and polyesters. These resins may be used alone or in combination. Examples of the composite particles include pigment particles coated with a resin material or another pigment, resin particles coated with a pigment, and particles composed of a mixture of a pigment and a resin material at a certain ratio.

Examples of the pigment particles coated with another pigment include titanium oxide particles coated with silicon oxide or aluminum oxide. These particles can be used as white particles. Carbon black particles or coated carbon black particles can be used as colored particles (black particles).

The type (color) of electrophoretic particles and/or dispersion medium 5 enclosed in the cells 13 can be appropriately determined to set the display color of the cells 13 to white or black, one of three primary colors, red, green, and blue (RGB), or one of three colors cyan (C), magenta (M), and yellow (Y). This allows monochrome display or color display.

After the disperse system 14 is supplied to the cells 13, the openings of the cells 13 are sealed to form a display area for use in the EPD 1.

FIGS. 4A to 4D are schematic views illustrating known processes of enclosing the disperse system 14 in the cells 13. FIGS. 5A to 5F are schematic views illustrating processes of enclosing the disperse system 14 in the cells 13 according to the present embodiment.

Figure 4A:
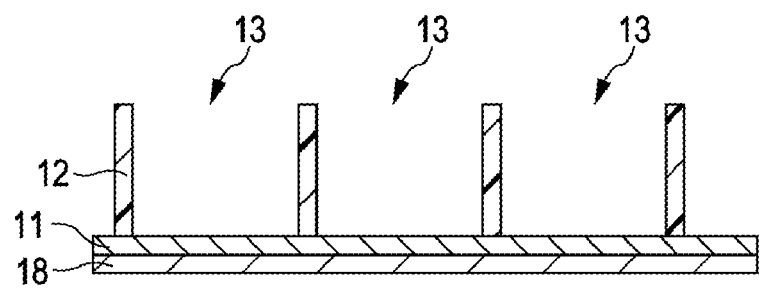
FIG. 4A is a schematic view illustrating a known process of enclosing a disperse system in cells.
Figure 4B:
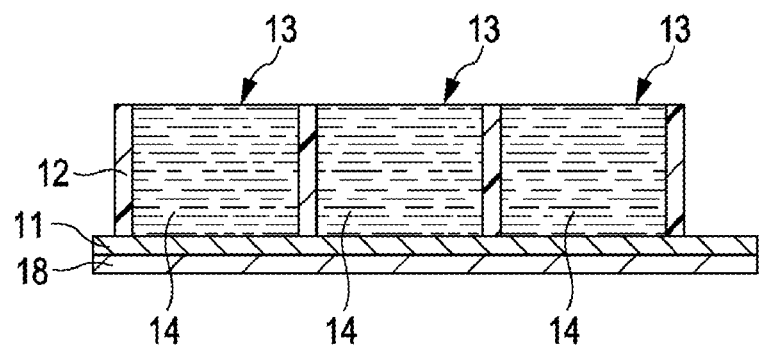
FIG. 4B is a schematic view illustrating the known process of enclosing the disperse system in the cells.
Figure 4C:
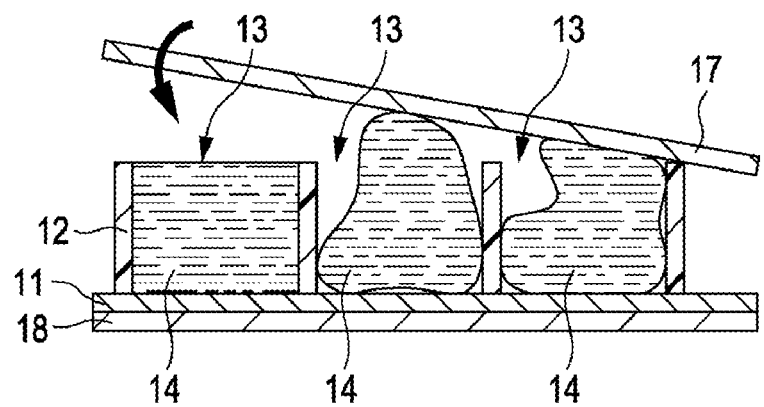
FIG. 4C is a schematic view illustrating the known process of enclosing the disperse system in the cells.
Figure 4D:
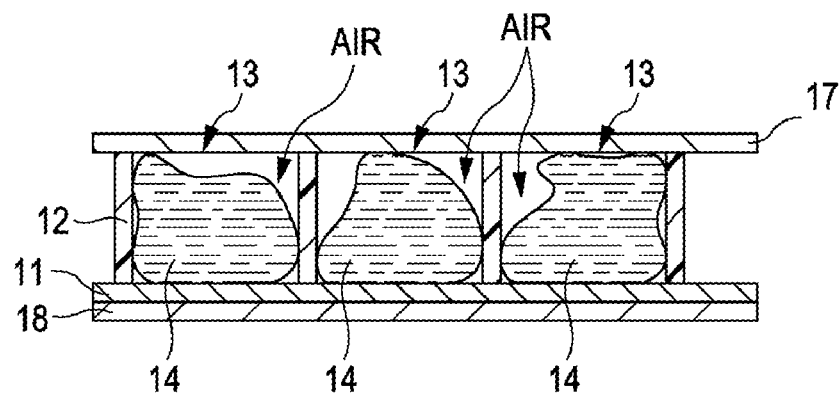
FIG. 4D is a schematic view illustrating the known process of enclosing the disperse system in the cells.

As illustrated in FIGS. 4A and 4B, in accordance with the known processes of enclosing the disperse system 14 in the cells 13, first, the cells 13 in the cell matrix 10 on one surface of the substrate 11 are supplied with the disperse system 14 by any of the methods described above. As illustrated in FIG. 4C, the substrate 17 is bonded to the partitions 12 of the cells 13 to seal the openings of the cells 13 in the cell matrix 10. As illustrated in FIG. 4C, when a portion of the substrate 17 comes into contact with the surface of the disperse system 14, the surface of the disperse system 14 is drawn to the substrate 17 by the action of surface tension. This causes the overflow of a portion of the disperse system 14 from the cells 13. As illustrated in FIG. 4D, when the substrate 17 is bonded to the partitions 12, the disperse system 14 is enclosed together with gas (bubbles), such as air, in the cells 13. The bubbles can cause deterioration in display quality.

Figure 5A:
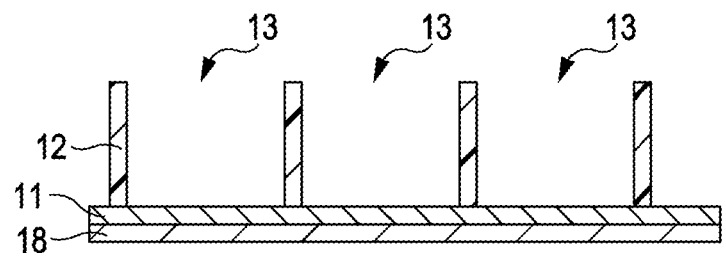
FIG. 5A is a schematic view illustrating a process of enclosing the disperse system in the cells according to an embodiment of the invention.
Figure 5B:
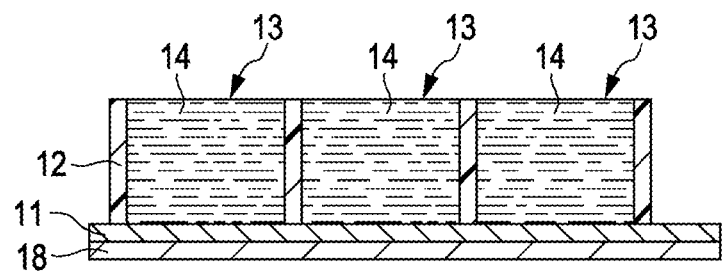
FIG. 5B is a schematic view illustrating the process of enclosing the disperse system in the cells according to the embodiment of the invention.
Figure 5C:
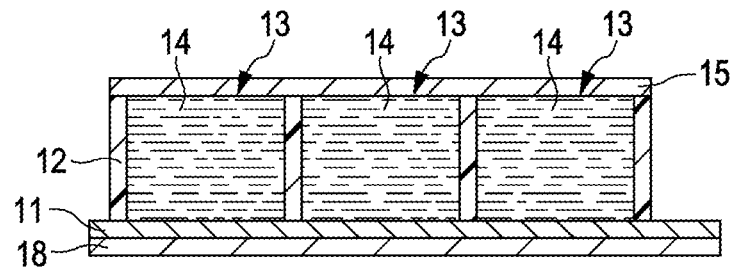
FIG. 5C is a schematic view illustrating the process of enclosing the disperse system in the cells according to the embodiment of the invention.
Figure 5D:
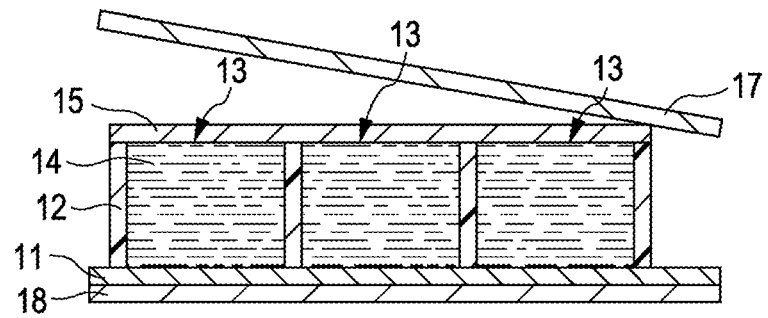
FIG. 5D is a schematic view illustrating the process of enclosing the disperse system in the cells according to the embodiment of the invention.
Figure 5E:
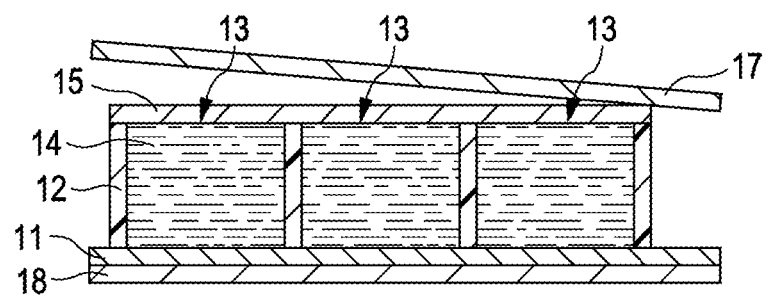
FIG. 5E is a schematic view illustrating the process of enclosing the disperse system in the cells according to the embodiment of the invention.
Figure 5F:
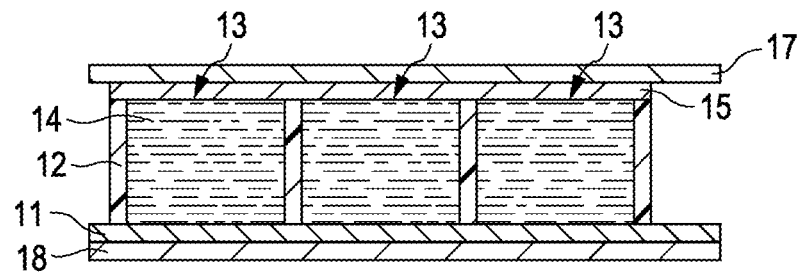
FIG. 5F is a schematic view illustrating the process of enclosing the disperse system in the cells according to the embodiment of the invention.

As illustrated in FIGS. 5A and 5B, in accordance with the processes of enclosing the disperse system 14 in the cells 13 according to the present embodiment, first, the cells 13 in the cell matrix 10 on one surface of the substrate 11 are supplied with the disperse system 14 by any of the methods described above. As illustrated in FIG. 5C, before the openings of the cells 13 are sealed with the substrate 17, a molecular film of amphiphilic molecules (hereinafter referred to as an LB film) 15 is formed on the (hydrophobic) exposed portions of the disperse system 14 in the openings and on the partitions 12. As illustrated in FIGS. 5D to 5F, the substrate 17 is bonded to the partitions 12 of the cells 13 with the LB film 15 interposed therebetween. The surface of the substrate 17 to be bonded (hereinafter referred to as a bonding surface) is coated with a UV-curable adhesive in advance. While the substrate 17 is pressed against the LB film 15, the UV-curable adhesive is cured by ultraviolet irradiation. Thus, the substrate 17 is fixed to the partitions 12 while the openings of the cells 13 are sealed, thereby enclosing the disperse system 14 in the cells 13.

In the present embodiment, the LB film 15 formed on the exposed portions of the disperse system 14 in the openings of the cells 13 in the cell matrix 10 reduces an affinity between the surface of the disperse system 14 and the bonding surface of the substrate 17 (in the present embodiment, the adhesive applied to the bonding surface). This can prevent the disperse system 14 in the cells 13 from being drawn by the substrate 17 by the action of surface tension while the openings are sealed with the substrate 17. This can easily and reliably prevent the incorporation of gas (bubbles), such as air, in the cells 13 while the openings are sealed with the substrate 17.

The UV-curable adhesive may be a water-soluble UV-curable adhesive that has a skeleton of a water-soluble polymer having a hydrophilic group, such as a hydroxy group, a carboxy group, or an amino acid group, and has a photopolymerizable group cross-linked to a molecular end of the water-soluble polymer. Examples of the water-soluble polymer include semi-synthetic polymers, such as cellulosic and starch compounds, and synthetic products, such as poly(vinyl alcohol), poly(ethylene glycol), poly(propylene glycol), poly (vinyl ether), sodium polyacrylate, and poly(ethylene oxide). Examples of the photopolymerizable group include acrylates, methacrylates, an acryloyl group, and a methacryloyl group.

In addition to the sealing method using the bonding surface of the substrate 17 coated with an adhesive, the openings may be sealed by another method. For example, a sealant curable by natural drying or ultraviolet irradiation may be applied to the periphery of the substrate 17 including a joint between the substrate 17 and the partitions 12. In the case that the bonding surface of the substrate 17 is not coated with an adhesive, the bonding surface of the substrate 17 may be modified to have a low affinity for the LB film 15. For example, the bonding surface of the substrate 17 is coated with a chemical solution for lowering the affinity for the LB film 15.

In order to reliably form the LB film 15 on the partitions 12, it is desirable that the top surfaces of the partitions 12 be such that the LB film 15 can be easily formed (hydrophobic). For example, the partitions 12 are dipped in a chemical solution such that the LB film 15 can be easily formed.

A process of forming an LB film 15 according to the present embodiment will be described below with reference to FIGS. 6A to 8D.

FIGS. 6A to 6D are schematic views illustrating a process of forming the LB film 15 according to the present embodiment. FIG. 7A is a schematic view of the structure of an amphiphilic molecule. FIG. 7B is a schematic view of amphiphilic molecules on the surface of a liquid after a developing liquid was dropped on the surface. FIG. 7C is a schematic view of amphiphilic molecules during barrier compression. FIGS. 8A to 8D are schematic views illustrating a principle of the formation of the LB film 15 according to the present embodiment.

Figure 6A:
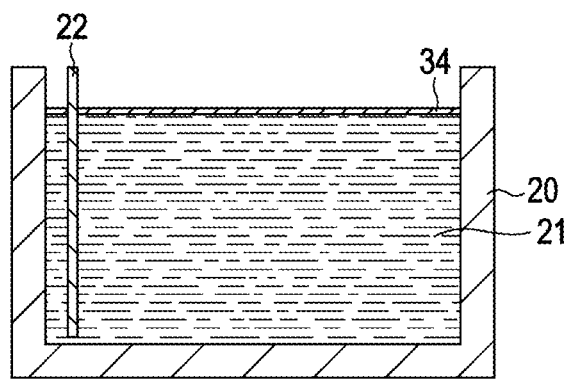
FIG. 6A is a schematic view illustrating a process of forming an LB film according to an embodiment of the invention.
Figure 7A:
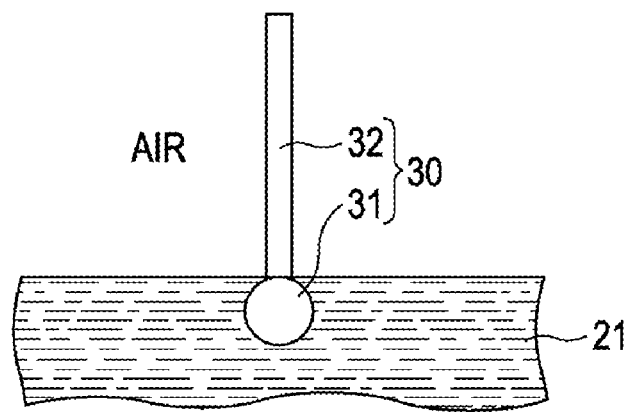
FIG. 7A is a schematic view of the structure of an amphiphilic molecule.
Figure 7B:
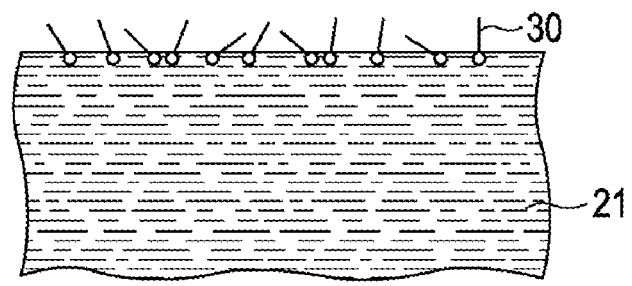
FIG. 7B is a schematic view of amphiphilic molecules on the surface of a liquid after a developing liquid was dropped on the surface.
Figure 7C:
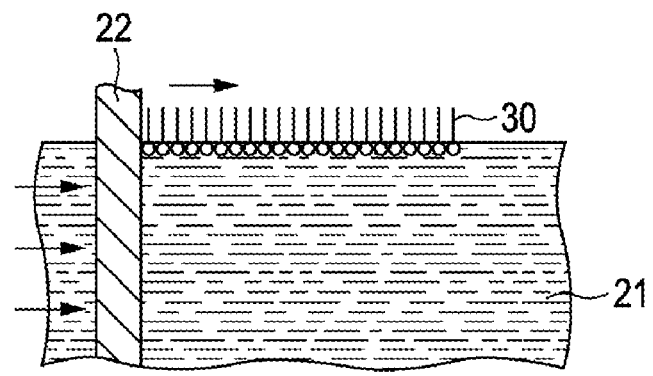
FIG. 7C is a schematic view of amphiphilic molecules during barrier compression.

First, as illustrated in FIG. 6A, after the cells 13 are supplied with the disperse system 14, a molecular film 34 of amphiphilic molecules is formed on the surface of a liquid 21 (water in the present embodiment) in a water tank 20. As illustrated in FIG. 7A, each of amphiphilic molecules 30 has both a hydrophilic group 31 and a hydrophobic group 32.

Figure 8A:
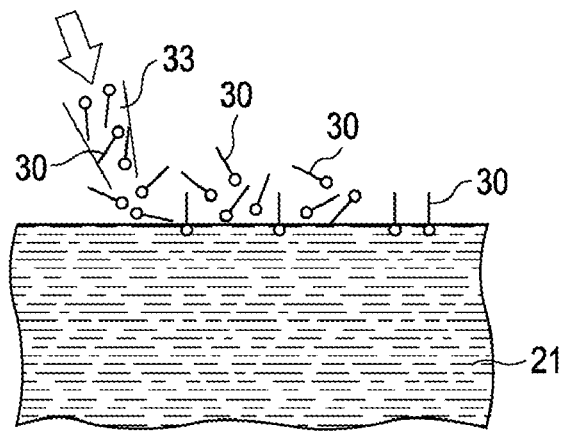
FIG. 8A is a schematic view illustrating the principle of the formation of the LB film according to an embodiment of the invention.

As illustrated in FIG. 8A, a developing liquid 33 containing an amphiphilic substance in a developing solvent is dropped on the surface of the liquid 21 in the water tank 20. The amphiphilic molecules 30 in the developing liquid 33 spread over the surface of the liquid 21 while the hydrophilic group 31 of each of the amphiphilic molecules 30 faces the liquid 21 and the hydrophobic group 32 faces the air, forming the monomolecular film 34 on the surface of the liquid 21.

Examples of the amphiphilic substance include lauric acid, myristic acid, pentadecylic acid, palmitic acid, margaric acid, stearic acid, arachidic acid, elaidic acid, and monounsaturated fatty acids.

Examples of the developing solvent include benzene, toluene, dichloromethane, chloroform, various alcohols, and various ethers.

As illustrated in FIG. 7B, the amphiphilic molecules 30 in the developing liquid 33 dropped on the surface of the liquid 21 spread randomly and sparsely. Thus, as illustrated in FIG. 7C, a barrier 22 made of a flat board is moved to compress the amphiphilic molecules 30 such that the monomolecular film 34 has an appropriate surface pressure (such that the molecules are regularly and densely oriented). Thus, the amphiphilic molecules 30 are regularly and densely oriented to form the monomolecular film 34 on the surface of the liquid 21.

Figure 6B:
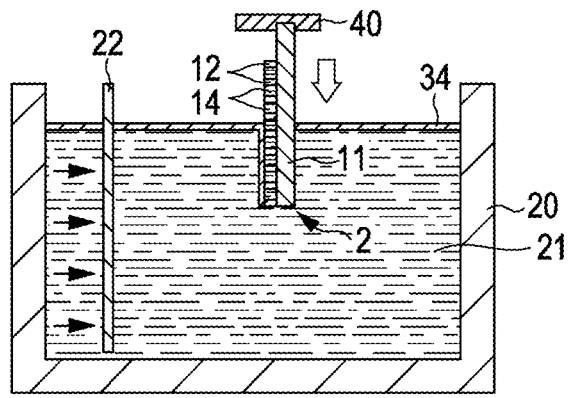
FIG. 6B is a schematic view illustrating the process of forming the LB film according to the embodiment of the invention.
Figure 6C:
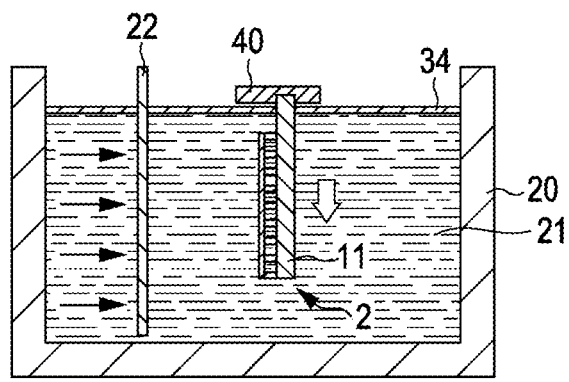
FIG. 6C is a schematic view illustrating the process of forming the LB film according to the embodiment of the invention.
Figure 6D:
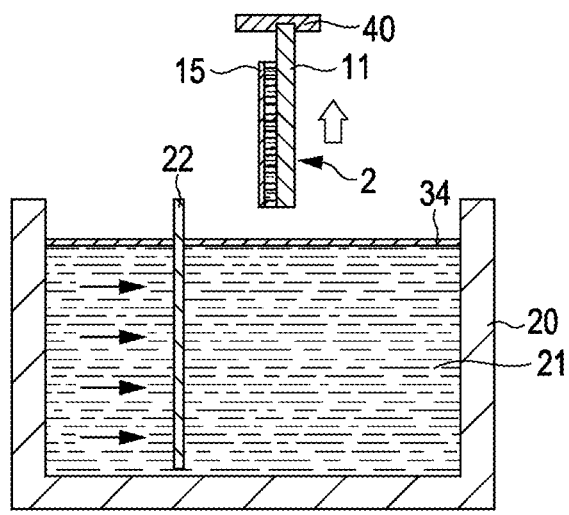
FIG. 6D is a schematic view illustrating the process of forming the LB film according to the embodiment of the invention.

In the present embodiment, as illustrated in FIGS. 6B to 6D, while the barrier 22 is moved in the direction of the arrow, an electrophoretic display base 2, which is composed of the substrate 11 and the cell matrix 10 to which the disperse system 14 has been supplied, supported by a jig 40 is dipped into and raised out of the liquid 21. Thus, the monomolecular film 34 on the surface of the liquid 21 is transferred to the electrophoretic display base 2, forming the LB film 15 on the exposed portions of the disperse system 14 and the partitions 12.

Figure 8B:
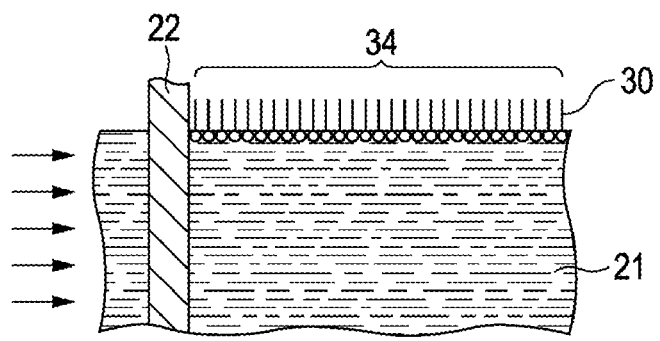
FIG. 8B is a schematic view illustrating the principle of the formation of the LB film according to the embodiment of the invention.
Figure 8C:
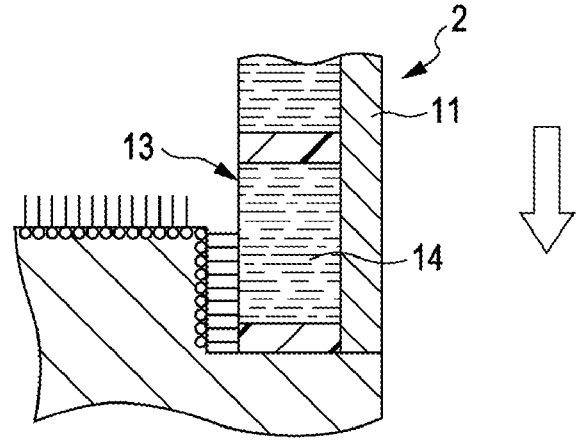
FIG. 8C is a schematic view illustrating the principle of the formation of the LB film according to the embodiment of the invention.

More specifically, as illustrated in FIGS. 6B and 6C, the cell matrix 10 of the electrophoretic display base 2 is passed through the monomolecular film 34 on the surface of the liquid 21 in the water tank 20 and is partly or entirely dipped into the liquid 21. Thus, as illustrated in FIGS. 8B and 8C, the barrier 22 regularly and densely arranges the amphiphilic molecules 30 and presses the monomolecular film 34 against the surface of the electrophoretic display base 2 on which the LB film 15 is to be formed.

Since the disperse system 14 (more specifically, the dispersion medium 5, which is an organic solvent) is oily, the hydrophobic groups 32 of the amphiphilic molecules 30 of the monomolecular film 34 are adsorbed on the exposed portions of the disperse system 14 because of an affinity between the hydrophobic groups 32 of the amphiphilic molecules 30 and the hydrophobic dispersion medium 5. In the present embodiment, since at least the top surfaces of the partitions 12 are hydrophobic, the monomolecular film 34 is also adsorbed on the partitions 12.

As illustrated in FIG. 6D, the electrophoretic display base 2 partly or entirely dipped into the liquid 21 is then raised out of the liquid 21 with the jig 40. Because the developing solvent of the developing liquid 33 is relatively highly volatile, the developing solvent immediately vaporizes in the air.

Figure 8D:
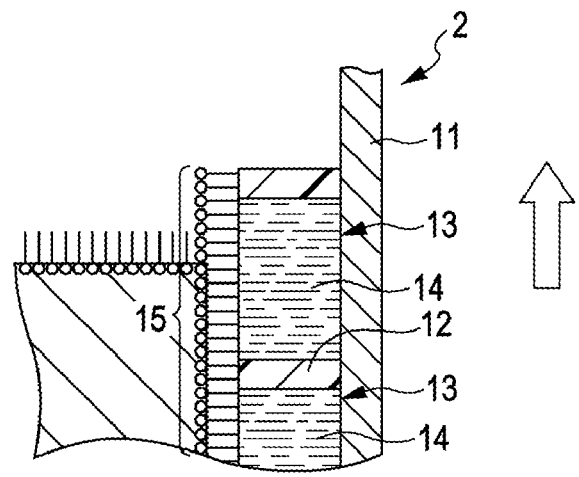
FIG. 8D is a schematic view illustrating the principle of the formation of the LB film according to the embodiment of the invention.

As illustrated in FIG. 8D, the monomolecular film 34 has been transferred to the electrophoretic display base 2 raised in the air, forming the LB film 15 on the partitions 12 and the exposed portions of the disperse system 14 in the cells 13 in the cell matrix 10 of the electrophoretic display base 2.

The method for forming the LB film 15 described above is generally referred to as a vertical dipping method.

For convenience in explaining the principle, the monomolecular film 34 is transferred in the present embodiment. However, the formation of a monomolecular film (having a thickness of approximately 1 nm) requires accurate pressure control and is therefore difficult in mass production. Thus, a film of amphiphilic molecules having a slightly large thickness (for example, 50 nm) may also be used. Hence, the LB film 15 in the present embodiment may be not only a monomolecular film but also a film of amphiphilic molecules having a slightly large thickness, which is not a monomolecular film.

When the cells 13 in the cell matrix 10 are tilted, the disperse system 14 in the cells 13 may be distorted by gravitation. However, the opening area of the cells 13 and the height of the partitions 12 can be appropriately determined such that the disperse system 14 is held in the cells 13 by the action of surface tension.

After the LB film 15 is formed on the exposed portions of the disperse system 14 and the partitions 12 in the cell matrix 10, the substrate 17 coated with the UV-curable adhesive is irradiated with ultraviolet rays while being pressed against the LB film 15. Thus, the substrate 17 is fixed to the partitions 12 while the openings of the cells 13 are sealed with the substrate 17, thereby enclosing the disperse system 14.

The openings of the cells 13 may be sealed with the substrate 17 some time after the electrophoretic display base 2 has been raised out of the liquid 21. This allows water or developing solvent on the LB film 15 to vaporize, thereby preventing the water or developing solvent from inhibiting the curing of the adhesive.

Figure 9:
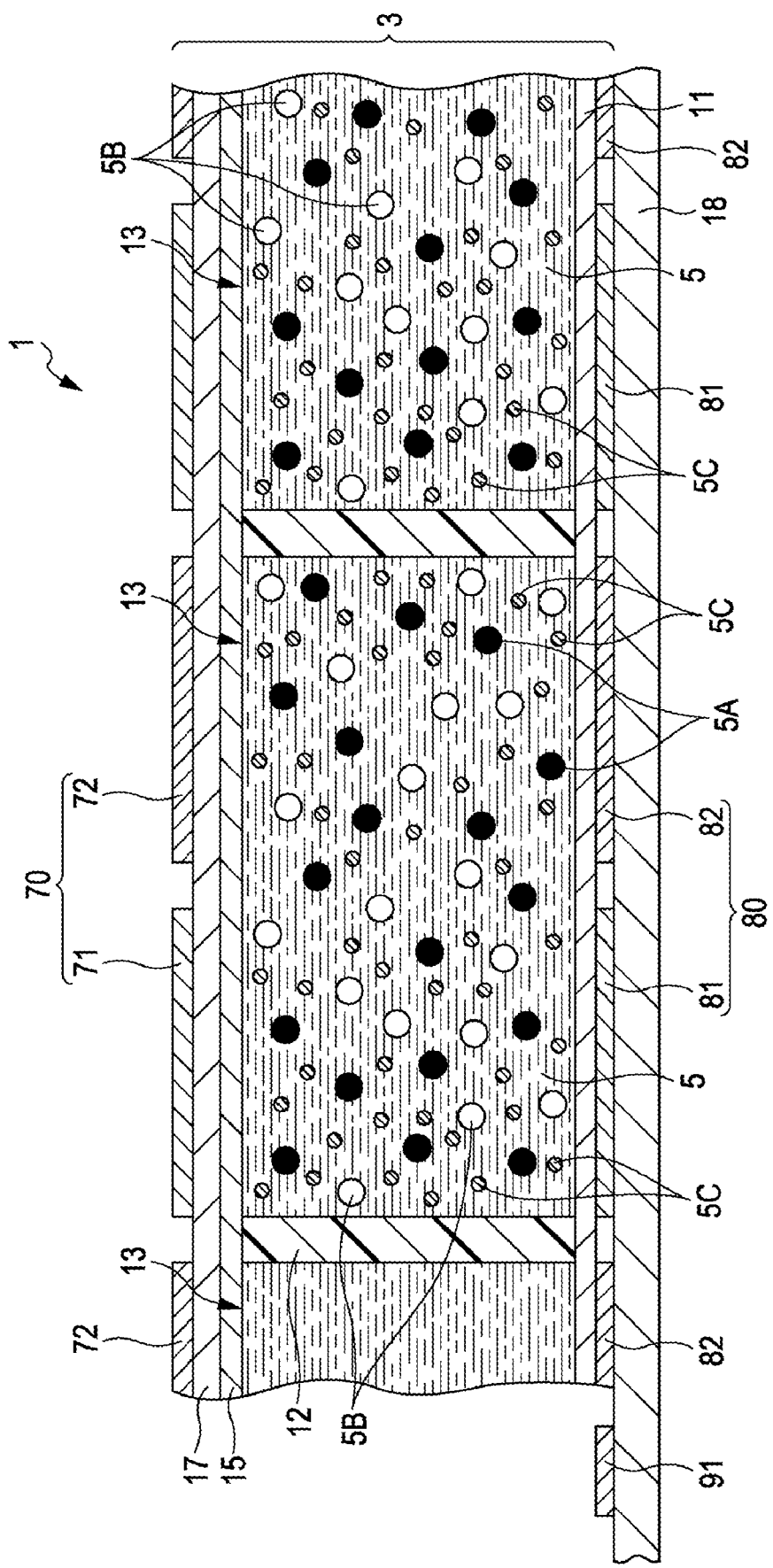
FIG. 9 is a schematic fragmentary sectional view of the electrophoretic display illustrated in FIG. 1.

FIG. 9 is a schematic fragmentary sectional view of the electrophoretic display 1 illustrated in FIG. 1.

As illustrated in FIG. 9, after the disperse system 14 is enclosed with the LB film 15 and the substrate 17, two electrodes 81 and 82 (electrodes 80) per cell are formed on the other surface of the substrate 11 opposite the cell matrix 10 (opposite to a viewing direction 100). Furthermore, two electrodes 71 and 72 (electrodes 70) per cell are formed on the viewing side of the substrate 17. The substrate 11, the substrate 17, the cells 13, the electrodes 71, 72, 81, and 82 constitute an electrophoretic display unit 3, which functions as a display area of the electrophoretic display 1.

In order to make the cells 13 each corresponding to a pixel viewable, the substrate 17 and the electrodes 71 and 72 on the viewing side may be a transparent substrate and transparent electrodes through which light having a visible light wavelength can pass.

The materials of the transparent substrate and the transparent electrodes may be substantially electroconductive materials. Non-limiting examples of the electroconductive materials include metallic materials, such as copper, aluminum, and alloys thereof; carbon materials, such as carbon black; electronically conductive polymer materials, such as polyacetylene, polypyrrole, and derivatives thereof; ion-conductive polymer materials in which an ionic substance, such as NaCl, $LiClO_4$, KCl, LiBr, $LiNO_3$, or LiSCN, is dispersed in a matrix resin, such as poly(vinyl alcohol), polycarbonate, or poly(ethylene oxide); and electroconductive oxide materials, such as indium tin oxide (ITO), fluorine-doped tin oxide (FTO), tin oxide ($SnO_2$), and indium oxide (IO). These materials may be used alone or in combination. A non-limiting example of the transparent electrodes is a PET/ITO sheet NXC1 manufactured by Toray Industries, Inc. The electrodes 81 and 82 may be made of the same material as described above.

The electrodes 81 and 82 may be formed on one surface of a circuit board 18. In addition to the electrodes 81 and 82, the circuit board 18 may include a thin-film transistor (TFT), which functions as a switching element, and electric circuits (not shown) including a control circuit 91 for controlling the voltage applied to the electrodes 71, 72, 81, and 82. The control circuit 91 is electrically connected to the electrodes 71, 72, 81, and 82 and can independently control the voltage and polarity (positive or negative) applied to the electrodes 71, 72, 81, and 82.

Mass production may employ a plurality of water tanks 20, and the LB film 15 can be sequentially formed on one electrophoretic display base 2 in each of the water tanks 20 (a batch process).

Figure 10:
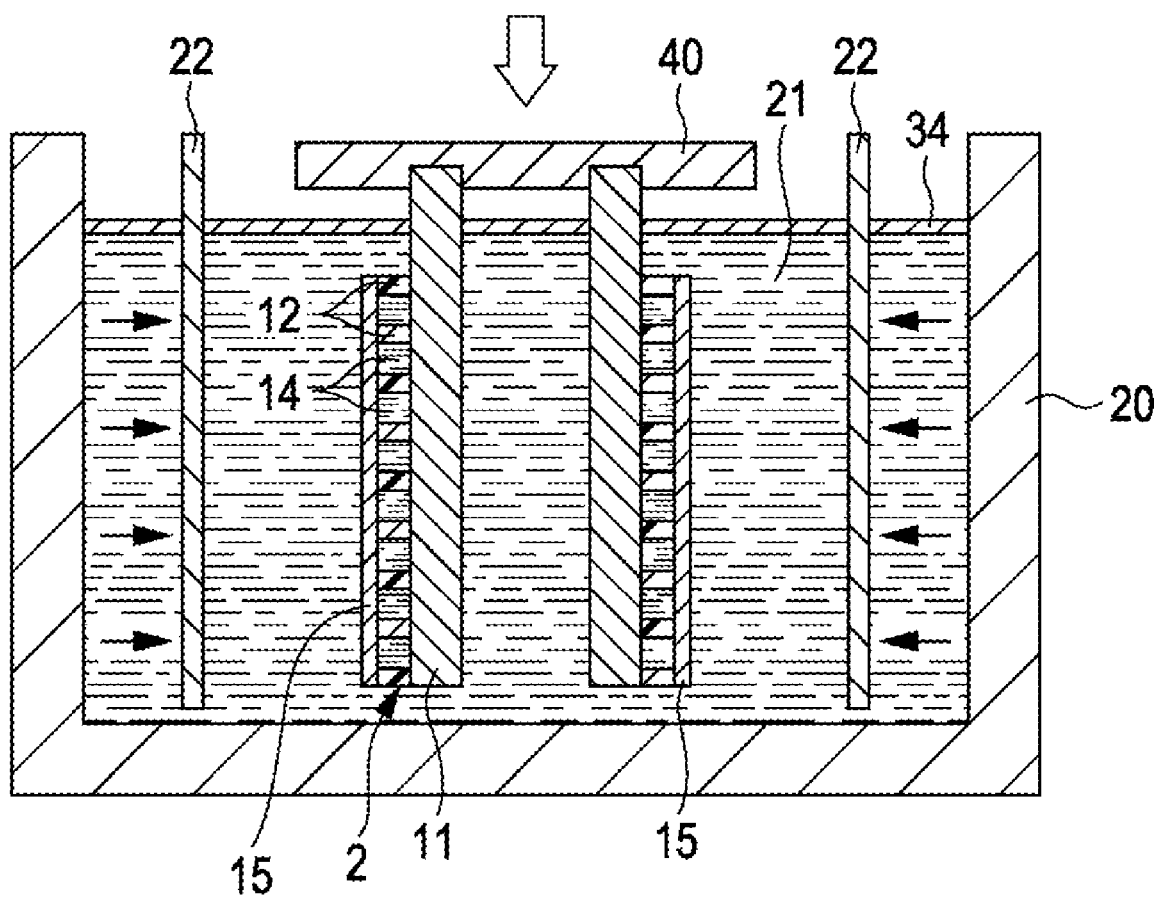
FIG. 10 is a schematic view illustrating a process of forming an LB film in mass production.

Alternatively, as illustrated in FIG. 10, the LB film 15 may be simultaneously formed on two electrophoretic display bases 2 in each of the water tanks 20. The two electrophoretic display bases 2 are supported by a jig 40 while the surfaces of the cell matrixes 10 on which the LB film 15 is not formed face each other. Barriers 22 are provided on both sides of the water tank 20.

FIG. 10 is a schematic view illustrating a process of forming the LB film 15 in mass production.

The water tank 20, the barriers 22, and the jig 40 may be extended in the depth direction. The LB film 15 may be simultaneously formed on a plurality of electrophoretic display bases 2 supported by the jig 40 in the depth direction.

In this manner, the LB film 15 is formed over at least the exposed portions of the disperse system 14 in the cells 13 on the electrophoretic display base 2, and the openings are then sealed with the substrate 17. This can easily minimize the incorporation of air (bubbles) into the cells 13 during the enclosure of the disperse system 14 in the cells 13 (in other words, more effectively prevent the incorporation of air (bubbles) into the disperse system 14). The minimum incorporation of air (bubbles) allows a desired electric field to be appropriately applied to the electrophoretic particles in the cells 13, improves the efficiency in the control of the electrophoretic particles in the disperse system 14, and consequently improves the display performance of the EPD 1.

The LB film 15 having a thickness of a monomolecular film (for example, 1 nm) can be formed by the vertical dipping method. The thickness of the LB film 15 can be easily controlled by forming a plurality of monomolecular films. Thus, the thin LB film 15 having a desired thickness (for example, 1 to 50 nm) can be easily formed. This can reduce the thickness of a dielectric layer between the electrodes 71 and 72 on the top side and the electrodes 81 and 82 on the back side. This can reduce the thickness of a layer shielding an electric field, thereby increasing (strengthening) the effective electric field applied to the electrophoretic particles in the cells and correspondingly reducing the driving voltage.

The surface level of the LB film 15 relative to the height of the partitions 12 (in the direction perpendicular to the substrate 11) can be controlled by the amount of disperse system 14 supplied to the cells 13. For example, the surface of the LB film 15 may be flush with the opening surfaces of the cells 13 (the end faces of the partitions 12). This can improve the flatness of the sealing surface of the cell matrix 10 and consequently the flatness of the display area of the EPD 1.

Use of electrophoretic particles subjected to a hydrophobic surface treatment can improve the retentivity of the electrophoretic particles drawn toward the substrate 17 by the electrodes 71 and 72, because of the interaction between the hydrophobic groups of the LB film 15 and the hydrophobic portions on the surfaces of the particles.

EXAMPLE

An enclosure method according to an example of the invention will be described below.

The substrate 11 and the substrate 17 were made of the NXC1 manufactured by Toray Industries, Inc. The partitions 12 of the cells 13 were formed by photolithography with TMMR-S2000 manufactured by Tokyo Ohka Kogyo Co., Ltd. The disperse system 14 contained a dispersion medium Isopar M manufactured by Exxon Co., a blue dye Oil-Blue BA manufactured by Chuo Synthetic Chemical Co., Ltd., white particles CR-90 manufactured by Ishihara Sangyo Kaisha, Ltd., and a dispersant Sylvan S-83 manufactured by Matsumoto Yushi-Seiyaku Co., Ltd.

The amounts of the white particles, the blue dye, the dispersant, and the dispersion medium were 0.2 g, 10 mg, 0.1 g, and 1 mL.

0.2% by weight of stearic acid serving as the material (amphiphilic substance) of the LB film 15 was dissolved in a developing solvent diisopropyl ether to prepare the developing liquid 33.

Under the conditions described above, the electrophoretic display base 2 was formed. The LB film 15 was formed on the exposed portions of the disperse system 14 and the partitions 12 in the cell matrix 10. After enclosure with the LB film 15 and the substrate 17, the presence of bubbles in the cells 13 was examined. In accordance with the enclosure method according to the present example, the percentage of cells containing bubbles was 2% or less. In contrast, in accordance with a known enclosure method, the percentage of cells containing bubbles was 10% or more. Regarding the presence of unevenness in display examined by visual inspection, the enclosure method according to the present example produced no unevenness. In contrast, the known enclosure method produced unevenness in display.

In the embodiments described above, the substrate 11 corresponds to a first substrate, the substrate 17 corresponds to a second substrate, the disperse system 14 corresponds to a dispersion liquid, and the LB film 15 corresponds to a sealing film.

Although the LB film 15 is formed on the partitions 12 in the embodiments described above, no LB film may be formed on the partitions 12 irrespective of the amount of disperse system 14 supplied.

Although the electrophoretic display unit 3 includes the electrodes on the substrates 11 and 17 in the embodiments described above, the electrophoretic display unit 3 with no electrode may be used as printable paper.

What is claimed is:

1. A method for enclosing a dispersion liquid in a plurality of cells on one surface of a first substrate, the dispersion liquid containing electrophoretic particles dispersed in a hydrophobic dispersion medium, the plurality of cells being defined by a plurality of partitions, the method comprising:
supplying the dispersion liquid to the plurality of cells through openings defined by the partitions;
forming a sealing film containing amphiphilic molecules over at least exposed portions of the dispersion liquid in the plurality of cells; and
covering the sealing film on the openings with a second substrate to hermetically seal the openings with the sealing film interposed therebetween.

2. The method according to claim 1, wherein a molecular film of amphiphilic molecules is formed on the surface of water in a container, the plurality of cells are supplied with the dispersion liquid, and then the first substrate is dipped into and raised out of the water at a predetermined angle with respect to the surface of the water to form the sealing film over at least exposed portions of the dispersion liquid in the plurality of cells.

3. The method according to claim 1, wherein a UV-curable adhesive layer is formed on a surface of the second substrate to be in contact with the sealing film, the openings are covered with the second substrate, and the second substrate is then irradiated with ultraviolet rays to fix the second substrate to the partitions and hermetically seal the openings.

4. The method according to claim 1, wherein an amphiphilic substance selected from the group consisting of lauric acid, myristic acid, pentadecylic acid, palmitic acid, margaric acid, stearic acid, arachidic acid, elaidic acid, and monounsaturated fatty acids is used in the formation of the sealing film containing amphiphilic molecules.

5. The method according to claim 1, wherein the dispersion medium is selected from the group consisting of alcohol solvents, esters, terpenes, aliphatic hydrocarbons, aromatic hydrocarbons, hydrophobic organic solvents, and mixtures thereof.

6. An electrophoretic display unit, comprising:
a first substrate;
a plurality of cells defined by a plurality of partitions on one surface of the first substrate;
a dispersion liquid supplied to the plurality of cells, the dispersion liquid containing electrophoretic particles dispersed in a hydrophobic dispersion medium;
a sealing film containing amphiphilic molecules formed over at least exposed portions of the dispersion liquid in the plurality of cells; and
a second substrate,
wherein the second substrate covers the sealing film on openings defined by the partitions to hermetically seal the openings with the sealing film interposed therebetween.

7. The electrophoretic display unit according to claim 6, wherein the sealing film containing amphiphilic molecules is formed of molecules of one acid selected from the group consisting of lauric acid, myristic acid, pentadecylic acid, palmitic acid, margaric acid, stearic acid, arachidic acid, elaidic acid, and monounsaturated fatty acids.

8. The electrophoretic display unit according to claim 6, wherein the dispersion medium contains any one selected from the group consisting of alcohol solvents, esters, terpenes, aliphatic hydrocarbons, aromatic hydrocarbons, hydrophobic organic solvents, and mixtures thereof.

* * * * *